June 24, 1958   C. A. HARLESS ET AL   2,840,399
ATTACHMENT OF GEARS TO TAPERED SHAFT ENDS
Filed July 26, 1952   2 Sheets-Sheet 1
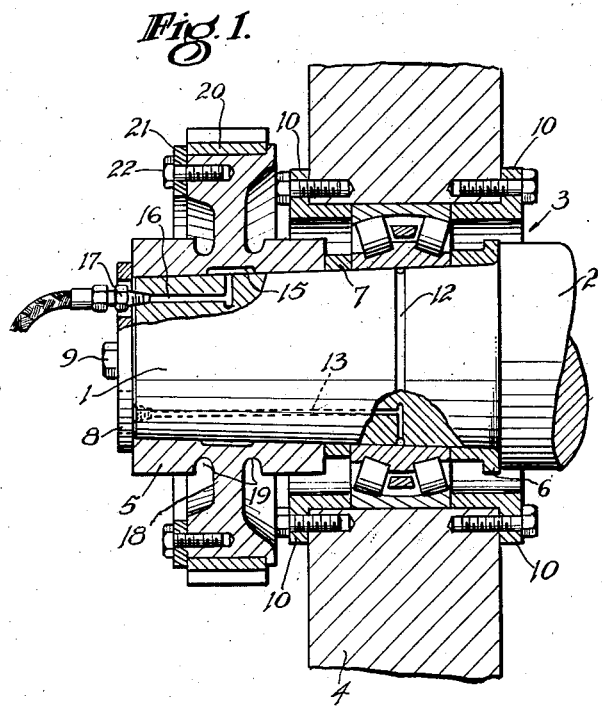
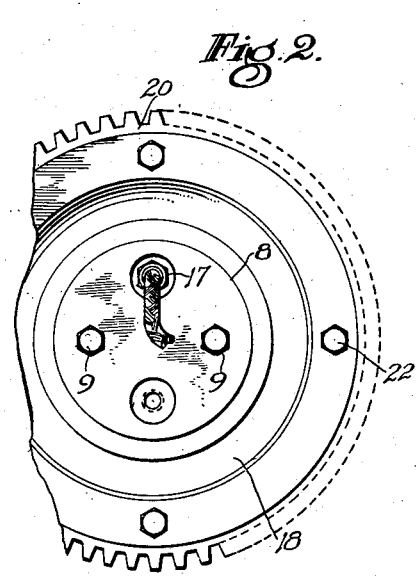
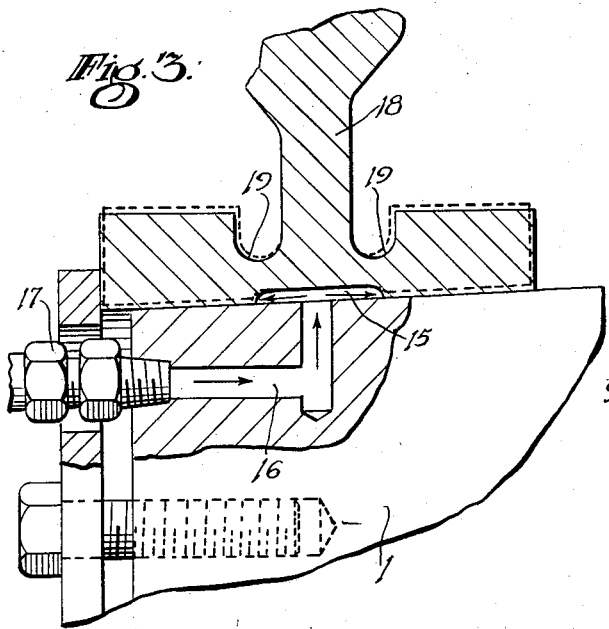
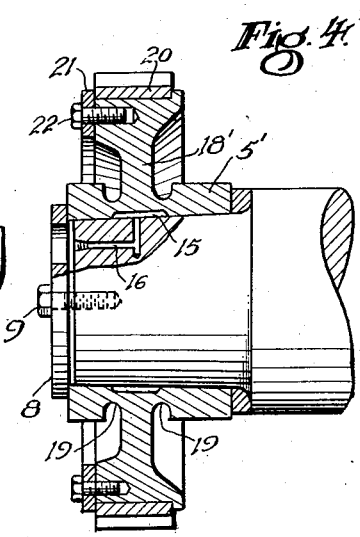
INVENTORS.
Charles A. Harless
BY Emory W. Worthington
ATTORNEYS June 24, 1958  C. A. HARLESS ET AL  2,840,399
ATTACHMENT OF GEARS TO TAPERED SHAFT ENDS
Filed July 26, 1952  2 Sheets-Sheet 2

INVENTORS.
Charles A. Harless
BY Emory W. Worthington
ATTORNEYS

United States Patent Office 2,840,399
Patented June 24, 1958

2,840,399

ATTACHMENT OF GEARS TO TAPERED SHAFT ENDS

Charles A. Harless, Riverside, Conn., and Emory W. Worthington, Hastings-on-Hudson, N. Y., assignors to R. Hoe & Co., Inc., New York, N. Y., a corporation of New York Application July 26, 1952, Serial No. 301,066

7 Claims. (Cl. 287—53)

This invention relates to improvements in the attachment of gears and other members having axially projecting hubs to tapered shaft ends.

More particularly, the invention is concerned with the shrink fitting of gears and similar members on shafts. This has been accomplished heretofore by heating or refrigerating one of the members, this being a procedure of limited applicability, and even where applicable having a tendency to involve over stressing the web of a gear or similar member. Elements such as bearings and coupling sleeves have been fitted to shafting by expanding the elements hydraulically, but it has not been possible to shrink fit a member such as a gear in this way, due to the excessive pressure required to expand the portion of the gear hub in radial alignment with the web.

It is an object of the invention to provide for the attachment of a gear or other drive member to a tapered shaft, by expanding certain portions of the hub of the gear, while avoiding the excess pressure necessary to expand the web or any other radially extending part of the gear.

A further object of the invention is to provide for attaching a bearing and a gear or other drive member to a shaft as concentrically as possible, and without creating unbalanced strain conditions in the gear.

A still further object of the invention is to provide an attachment permitting removal of a gear or other drive member without the use of a gear puller or similar equipment.

With the foregoing objects, as well as others which will appear in the description, in mind, the invention consists in the combinations and arrangements of parts and details of construction which will now first be fully described with reference to the accompanying drawing, and then be more particularly pointed out in the appended claims.

In the drawing:

Figure 1 is an axial section of a gear and bearing assembly embodying the invention in a preferred form;

Figure 2 is an end elevation of the assembly of Figure 1;

Figure 3 is an enlarged detail of a part of Figure 1, showing the manner of placing a gear member upon a tapered shaft end;

Figure 4 is a section similar to Figure 1, but showing a modified construction;

Figure 6:
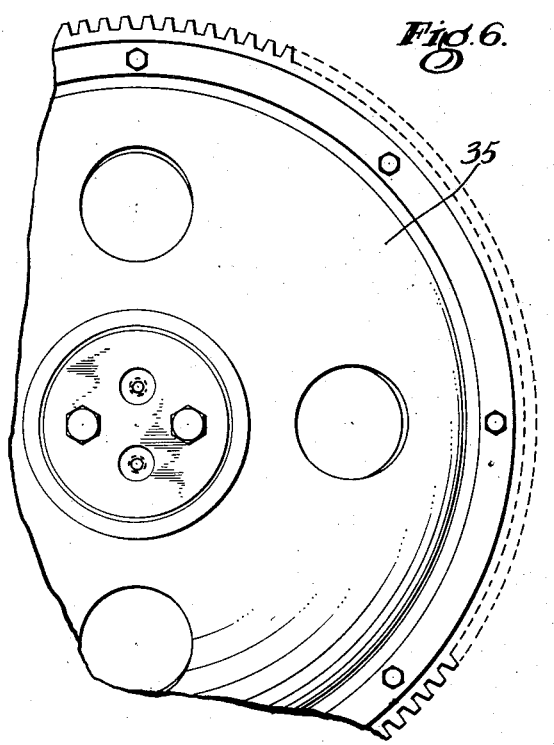
Figures 5 and 6 are axial sectional and end elevational views, showing a still further modification.

In the structure shown in Figure 1, the tapered end 1 of the shaft 2 is supported by means of a bearing, indicated generally at 3, in a frame 4, and carries a drive gear 5. The hub of the gear 5 and the inner race of the bearing 3 are located axially of the shaft by means of spacer rings 6 and 7 and a cap plate or washer 8 attached to the end of the shaft as by means of screws 9. The outer race of the bearing 5 is held in position within the frame 4 by means of rings 10 screwed thereto, as indicated.

In attaching the bearing and gear to the shaft, the cap plate 8 is removed, and the spacer 6, which need not fit tightly, is slid into position. Thereafter, the bearing is slid onto the shaft as far as it will go freely. With a taper of about one inch in twelve on the shaft end, which is the preferred taper, and assuming a diameter of about three inches, the inner bore of the bearing will have a diameter such as to fit on the shaft when about .035 inch away from the spacer 6, requiring an expansion of about .003 to move it in contact with the spacer. In general, a so-called class 8 fit is contemplated, the average interference being about .001 time the diameter. A good finish is desirable both from the standpoint of reducing leakage between the hub and shaft during the expansion of the hub, and from the standpoint of obtaining a strong grip or bond when the hydraulic pressure is released. A 40 micro inch finish, such as readily obtained by grinding, is satisfactory.

Oil under pressure is introduced into a circumferential groove 12 through a bore 13, expanding the bearing sufficiently to permit it to be pushed up against the spacer 6, by conventional means. Thereafter, the oil pressure is released, permitting the bearing inner race to contract and fixing it to the shaft with a shrink fit, the extent of shrink or interference being, as indicated, about .003 inch.

Spacer 7, which need not fit tightly, is now placed in position, and the gear 5 is slid into place on the end of the shaft. As in the case of the bearing, the bore in the gear hub is cut to a diameter to fit the shaft when the hub is about .035 inch from the spacer 7.

A groove 15 is radially aligned with the web 18 of the gear and extends axially beyond the same in both directions, as indicated. The peripheral surface of the hub is formed with grooves 19 at both sides of the web 18, these grooves being located in approximately radial alignment with the edges of the grooves 15. Both end portions of the hub are thus capacitated to make the small expansion required for shrink fitting it on the shaft. As the groove 15 provides clearance under the web of the gear, no expansion of the hub at this point is necessary. The action is illustrated in an exaggerated manner by dotted lines in Figure 3.

The shaft is provided with a bore 16 for supplying oil from a removable fitting 17. As in the case of the bearing, the gear hub is expanded by pumping oil under pressure into the groove 15 and the gear is moved along the shaft until seated against the spacer 7, at which time the oil pressure is released and the gear hub contracts into place, with a shrink fit or potential interference of about .003 inch.

The axial movement of the gear may be accomplished by tightening the bolts 9, so as to cause the washer 8 to move the gear axially of the shaft, and the axial movement of the bearing may be accomplished in a similar manner, utilizing a sleeve to transmit the thrust from the washer plate to the bearing. A hydraulic jack may also be utilized for this purpose, being fastened in place by bolts fitting in the holes in the shaft ends provided for the bolts 9.

The structure of Figure 1 preferably utilizes a single taper to take both the bearing and gear. Since the entire taper can be formed at once and with one setting of a machine, absolute concentricity of bearing and gear may be obtained, thus insuring ideal gear performance.

The shaft end and bores within the bearing and gear are preferably ground very smooth, a surface finish of 40 micro inches being suitable, as stated. Where keys or splines are utilized, it will invariably be found that there will be appreciable distortion of the gear due to these elements, even with the most careful workmanship. In most cases, the fit of a key will be either somewhat loose, permitting objectionable vibration, or unduly tight, unduly stressing the metal of the gear. With the gear construction of the invention, these difficulties are entirely eliminated. Without any keys or similar elements coupling the gear to the shaft, it has been found that heavy power can be transmitted with no difficulty. For example, in a structure of the size indicated, it was found that sixty thousand inch pounds of torque were required to cause the gear hub to turn on the shaft. Since this represents a carrying capacity of about four hundred horse power, even at a relatively low speed, such as 425 R. P. M., it will be apparent that ample power carrying capacity may be obtained with the structure of the invention without the use of any keys or similar elements.

The arrangement of the invention is also highly advantageous in facilitating removal and replacement of a gear. To remove a gear, it is only necessary to back off the bolts 9 slightly and introduce oil under pressure through the bore 16 so as to expand the gear hub, whereupon the gear will slide back against the washer 8 with no difficulty and may then be removed.

A pressure of about 5,000 pounds per square inch has been found suitable for either attaching or removing the gear, and may readily be achieved with a manually operable pump of suitable construction. It is not necessary to gauge the pressure accurately by means of a pressure gauge or other instrument, as it is found that the gear (or bearing) may be moved axially when the pressure has been raised to a sufficient point to begin to squeeze oil out around the shaft. The gear or bearing being floated on the oil, moves readily and without difficulty.

The gear 5 may be of integrally cast or welded construction or may be composite, as shown, the gear teeth being formed on a separate ring 20, press fitted to the rim of the gear body, and held in position by an annular washer 21 and screws 22. The composite construction has the advantage of permitting the easy grinding both of the hub bore and the rim of the gear to accurate concentricity. As will be apparent, any webbed element having a hub extending axially from the web may be shrink fitted to a shaft in the same way. Thus, the gear rim 20 might be replaced by a hydraulic impeller element or other torque transmitting device without affecting the fitting of the hub in any way.

While the advantage of the structure of the invention for a wide variety of uses will be apparent, it has been found particularly useful in machinery, such as printing machinery, where precise concentricity and rotary relationship between the cylinder and the gearing may be highly important. Where this relationship is determined as by means of a key and slot cut in the elements to be coupled together, the possibility for accurate control and fine adjustment is obviously limited. With the arrangement of the invention, however, the gear may be accurately placed upon the shaft in any angular position with relation to the shaft and will remain in such position. It is found not only as indicated above that the construction is capable of carrying heavy torque, but also that it does not creep under continuous applied torque, but holds firmly without movement until the torque limit is reached, at which point the bond between the hub and shaft breaks suddenly, permitting relative turning.

Where desired, the gear may be fixed to the shaft independently of a bearing, and a structure in which it is so attached is shown in Figure 4. The gear arm 18' need not be located centrally of the hub 5', and Figure 4 shows a construction in which it is displaced outwardly of the shaft from a central location. The construction and operation are in other respects the same as in the construction of Figures 1 to 3.

Figure 5:
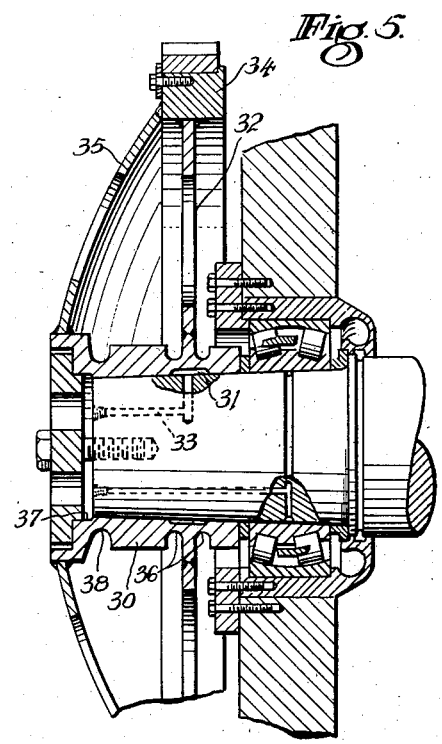

Figures 5 and 6 show the invention as applied to a gear structure of relatively large diameter and made up with a double web, the parts being welded together. In this structure, the relation of the bearing to the tapered shaft end is the same as in the structure of Figure 1. The hub 30 of the gear is formed with an internal groove 31 underlying the web 32 and supplied with oil through a bore 33 in the shaft, as before. The web 32 is welded to the hub and to the gear rim 34 as indicated, and a second web 35 is provided, being welded to the outer end of the hub 30 and to the rim 34, as indicated. In this case, relieving grooves 36 at each side of the web 32 are provided. In addition, the hub is relieved somewhat as at 37 toward the outer end of its bore and an additional groove 38 overlying the inner relieving groove 37 is provided. The hub is thus enabled to expand under hydraulic pressure for sliding onto the shaft, without being required to expand either the web 32 or the web 35.

Figure 7:
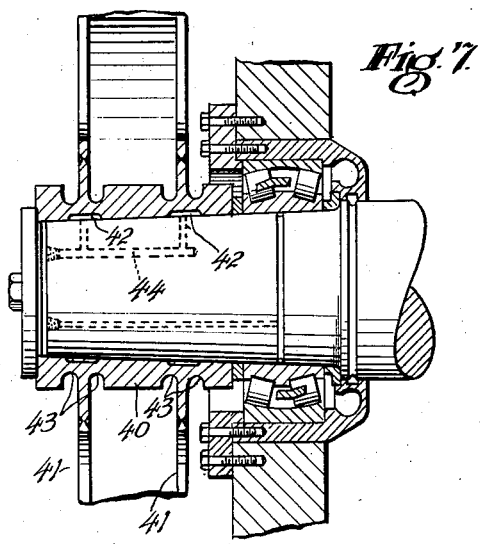

The invention may also be applied to double webbed gears where both webs extend radially, and such an application is shown in Figure 7. In this case, the hub 40 has a pair of radial webs 41 and the hub is relieved by grooves 43 at each side of these webs. The oil bore 44 has branches for supplying oil to both of the grooves 42 as indicated. The construction and operation is otherwise the same as in the embodiments previously described.

Figure 8:
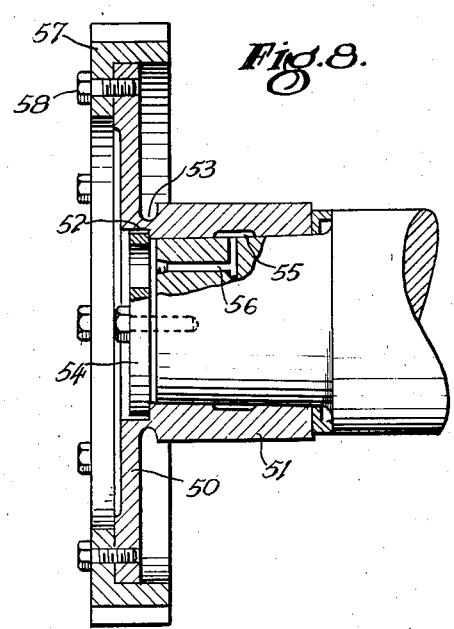
Figures 7 and 8 are axial sections, showing still further modifications.

In Figure 8 there is illustrated a construction in which the web 50 is located outwardly of the end of the shaft and of the hub 51. In this form, the hub is relieved inwardly as at 52 and outwardly as at 53, adjacent the web of the gear, the inner relief forming a shoulder for engagement by the retaining washer 54. The hub 51 itself does not require relief in order to permit the necessary expansion in placing it on or removing it from the shaft, and merely has an oil groove 55 supplied with oil under pressure through a bore 56. Expansion of the hub without expanding the gear arm 50 is permitted by the relief at point 53. In this construction also, while the gear may be formed as an integral structure, it is shown as having a rim 57 on which the teeth are formed, affixed to its web by means of bolts 58.

As will be apparent, the arrangement of the invention permits very considerable improvements in gear structure and in location of gears, due to the ease with which a gear may be removed when necessary without utilizing the usual gear pullers. Thus, a gear such as shown in Figure 5, may be conveniently constructed of relatively light weight metal in large diameters, as, for example, five or six feet, and may be removed without difficulty when necessary. With conventional gear structures, it will be apparent that the pulling of such a gear when once solidly frozen to the shaft after a long period of use without destroying the gear may well present problems impossible to solve.

As is apparent from the foregoing examples, the invention may be applied to structures of a rather wide variety of shapes and dimensions, and the relevant dimensions of the parts will vary accordingly. The hub thickness, where not relieved, is not critical and may be varied within fairly wide limits. It is preferably such as to require and permit shrink fitting with about 5,000 or 6,000 pounds per square inch hydraulic pressure. The relief adjacent the web of the element to be fitted is also not unduly critical. The relief should be carried far enough to permit fitting under the pressures indicated, and there is no advantage in carrying it further.

What is claimed is:

1. A keyless drive member comprising a hub having a tapered bore with an oil groove running circumferentially around the inside of the bore, and a web portion radially aligned with the groove, the hub having relieving exterior grooves around its entire periphery at each side of the web, and the internal and external grooves forming narrow sections at each side of the web, whereby the hub may be expanded on a shaft by pressure of a liquid introduced into the internal groove, so as to permit shrink fitting on the shaft, without substantial hindrance by rigidity of the web.

2. A drive member according to claim 1, in which the oil groove extends axially of the hub beyond the web.

3. A shaft assembly comprising in combination, a shaft having an end formed to a single uniform taper, oil channels within the shaft end communicating with the surface thereof at axially spaced points, for respectively supplying oil under pressure to permit shrink fitting on the shaft of a bearing and a drive member, and a drive member and bearing shrink fitted to the shaft in position to be expanded by introduction of liquid under pressure through the said channels.

4. A shaft assembly comprising in combination, a shaft having an end formed to a single uniform taper, oil channels within the shaft end communicating with the surface thereof at spaced points, for supplying oil under pressure to effect shrink fitting of a bearing and a drive member, and a drive member and bearing shrink fitted to the shaft in position to be expanded by introduction of liquid under pressure through the said channels, the drive member having a hub and web member fixed thereto, and the hub being grooved to reduce the section adjacent the web member whereby the hub is shrink fitted to the shaft without substantial hindrance by the web member.

5. A shaft assembly according to claim 4, in which the hub has a bore with a circumferential oil groove underlying and extending axially beyond the web.

6. A gear comprising a hub and web extending radially thereof, the hub having external grooving throughout the portion thereof axially adjacent the web reducing the section sufficiently to permit expansion of the hub without substantial hindrance by the web, and the hub having a tapered inner bore for fitting on a shaft with a circumferentially running oil groove in the wall of the said bore, spaced axially from the ends thereof, and radially underlying the groove.

7. A gear comprising a hub and web extending radially thereof, the hub having an external groove around its entire periphery adjacent the web on each side thereof reducing the section sufficiently to permit expansion of the hub without substantial hindrance by the web, and the hub having a tapered inner bore for fitting on a shaft with a circumferentially running oil groove in the wall of the said bore, spaced axially from the ends thereof, and radially underlying the said external grooves.

References Cited in the file of this patent

UNITED STATES PATENTS

| | | |
|---|---|---|
| 370,527 | Bogert | Sept. 27, 1887 |
| 1,863,401 | Faulkner et al. | June 14, 1932 |
| 2,084,439 | Hamer | June 22, 1937 |
| 2,230,045 | Boden | Jan. 28, 1941 |
| 2,348,293 | Hamer | May 9, 1944 |

FOREIGN PATENTS

| | | |
|---|---|---|
| 9,349 | Austria | Oct. 10, 1902 |
| 111,995 | Great Britain | Dec. 20, 1917 |
| 121,014 | Australia | Feb. 28, 1946 |